(12) United States Patent
Moorkanikkara

(10) Patent No.: US 9,683,777 B2
(45) Date of Patent: Jun. 20, 2017

(54) SEPARATING CARBON DIOXIDE FROM NATURAL GAS LIQUIDS

(71) Applicant: Srinivas N. Moorkanikkara, Metairie, LA (US)

(72) Inventor: Srinivas N. Moorkanikkara, Metairie, LA (US)

(73) Assignee: ExxonMobil Upstream Research Company, Spring, TX (US)

( * ) Notice: Subject to any disclaimer, the term of this patent is extended or adjusted under 35 U.S.C. 154(b) by 202 days.

(21) Appl. No.: 14/424,386

(22) PCT Filed: Sep. 30, 2013

(86) PCT No.: PCT/US2013/062686
§ 371 (c)(1),
(2) Date: Feb. 26, 2015

(87) PCT Pub. No.: WO2014/058648
PCT Pub. Date: Apr. 17, 2014

(65) Prior Publication Data
US 2015/0260453 A1   Sep. 17, 2015

Related U.S. Application Data

(60) Provisional application No. 61/711,130, filed on Oct. 8, 2012.

(51) Int. Cl.
*F25J 3/02* (2006.01)
*C10L 3/10* (2006.01)

(52) U.S. Cl.
CPC ............ *F25J 3/0266* (2013.01); *C10L 3/103* (2013.01); *C10L 3/104* (2013.01); *F25J 3/0209* (2013.01);

(Continued)

(58) Field of Classification Search
CPC .......... F25J 3/067; F25J 3/0266; F25J 2220/80
See application file for complete search history.

(56) References Cited

U.S. PATENT DOCUMENTS 3,376,709 A * 4/1968 Dickey ................... C07C 7/14
62/637
3,398,544 A * 8/1968 Crownover ............. C07C 7/14
62/637

(Continued)

FOREIGN PATENT DOCUMENTS

| WO | WO2008/095258 | 8/2008 | ............... C10G 5/06 |
|----|---------------|--------|--------------------------|
| WO | WO2009/084945 | 7/2009 | ............. B01D 47/10 |

OTHER PUBLICATIONS

Lawton, Simon et al. (2009) "Continuous Crystallization of Pharmaceuticals Using a Continuous Oscillatory Baffled Crystallizer," *Organic Process Research & Development*, v. 13, No. 6, pp. 1357-1363.

*Primary Examiner* — Brian King
(74) *Attorney, Agent, or Firm* — ExxonMobil Upstream Research Company Law Department

(57) ABSTRACT

Embodiments described herein provide a method and systems for separating carbon dioxide from heavy hydrocarbons. The method includes cooling a first liquid stream including carbon dioxide and heavy hydrocarbons within an oscillatory crystallization unit to generate carbon dioxide solids and a second liquid stream including the heavy hydrocarbons. The method also includes separating the carbon dioxide solids from the second liquid stream via a solid-liquid separation system.

21 Claims, 11 Drawing Sheets

(52) U.S. Cl.
CPC ............ *F25J 3/0233* (2013.01); *F25J 3/0238* (2013.01); *C10L 2290/06* (2013.01); *C10L 2290/54* (2013.01); *C10L 2290/541* (2013.01); *C10L 2290/543* (2013.01); *C10L 2290/547* (2013.01); *F25J 2200/02* (2013.01); *F25J 2205/02* (2013.01); *F25J 2205/10* (2013.01); *F25J 2205/20* (2013.01); *Y02C 10/12* (2013.01)

(56) References Cited

U.S. PATENT DOCUMENTS

| | | | |
|---|---|---|---|
| 4,246,015 A | 1/1981 | Styring, Jr. ...................... 62/12 |
| 4,351,655 A | 9/1982 | Styring, Jr. ...................... 62/28 |
| 5,615,561 A | 4/1997 | Houshmand et al. ........... 26/611 |
| 6,429,268 B1 * | 8/2002 | Xiongwei ............ B01J 19/0013 422/130 |
| 7,325,415 B2 * | 2/2008 | Amin ................. B01D 21/2455 62/532 |
| 2002/0189443 A1 | 12/2002 | McGuire ............................ 95/32 |
| 2008/0307827 A1 * | 12/2008 | Hino ......................... F25J 3/061 62/634 |
| 2009/0246339 A1 * | 10/2009 | Kellens ................ B01D 9/0013 426/417 |
| 2010/0186446 A1 | 7/2010 | Turner et al. .................... 62/611 |
| 2012/0125043 A1 | 5/2012 | Cullinane et al. .............. 62/620 |

\* cited by examiner

600

900

SEPARATING CARBON DIOXIDE FROM NATURAL GAS LIQUIDS

CROSS-REFERENCE TO RELATED APPLICATION

This application is the National Stage of International Application No. PCT/US2013/062686, filed Sep. 30, 2013, which claims the benefit of U.S. Provisional Patent Application 61/711,130 filed Oct. 8, 2012 entitled SEPARATING CARBON DIOXIDE FROM NATURAL GAS LIQUIDS, the entirety of which is incorporated by reference herein.

FIELD OF THE INVENTION

Exemplary embodiments of the present techniques are directed to the separation of carbon dioxide ($CO_2$) from natural gas liquids (NGLs). More specifically, exemplary embodiments of the present techniques are directed to the separation of $CO_2$ from a hydrocarbon stream containing NGLs by cooling the hydrocarbon stream below the freezing point of $CO_2$ and removing the resulting $CO_2$ solids from the hydrocarbon stream.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Natural gas reservoirs may often contain high levels of acid gases, such as carbon dioxide ($CO_2$). In these cases, a cryogenic process may provide an efficacious way to separate the acid gases from the methane. The cryogenic process could include a simple bulk fractionation, a Ryan-Holmes process, or a more complex cryogenic fractionation process. The cryogenic processes separate methane from $CO_2$ by condensation and fractionation, and can produce the acid gas in a liquid phase for efficient disposal via pumping. However, in the cryogenic processes, hydrocarbons heavier than methane, e.g., natural gas liquids (NGLs), are separated with the $CO_2$ in a single liquid stream. Often, the $CO_2$ will be immediately reinjected for disposal.

In some locations, a natural gas reservoir contains high levels of $CO_2$. In such locations, it may be desirable to use a cryogenic process to separate the $CO_2$ from the methane. The cryogenic process could be a simple bulk fractionation process, a Ryan-Holmes process, or a Controlled Freeze Zone (CFZ™) process. These processes separate methane from $CO_2$ by condensation or fractionation, and can provide the $CO_2$ as a liquid for efficient disposal. However, in these processes, the NGLs are also condensed and separated with the $CO_2$. Normally, the $CO_2$ will be reinjected for disposal. However, the NGLs are valuable. Thus, it may be desirable to recover the NGLs for sale.

Separation of the NGLs can be performed by fractionation. However, ethane forms an azeotropic mixture with $CO_2$, as discussed with respect to FIG. 1. Such an azeotropic mixture may prevent separation by normal techniques.

FIG. 1 is a temperature-composition phase plot 100 showing the equilibrium concentrations of $CO_2$ in a mixture with ethane at 4,137 kilopascals (kPa, 600 psia). The x-axis 102 indicates the mole fraction of $CO_2$, while the y-axis 104 represents the temperature in degrees Celsius (° C.). The concentration of the $CO_2$ in the vapor phase 106 matches the concentration of the $CO_2$ in the liquid phase 108 at about 70% $CO_2$/30% ethane, as indicated by an arrow 110. This prevents separation-by-fractionation across the azeotrope (left to right, or right to left).

FIG. 2 is a temperature-composition phase plot 200 showing the equilibrium concentrations of $CO_2$ in a mixture with ethane at 689.5 kPa (100 psia). Like numbered items are as described with respect to FIG. 1. As this plot 200 shows, concentration of the $CO_2$ in the vapor phase 106 approaches the concentration of the $CO_2$ in the liquid phase 108 at about 60% $CO_2$/40% ethane, as indicated by an arrow 202. This prevents separation-by-fractionation across the azeotrope (left to right, or right to left). As these plots 100 and 200 indicate, complete separation by fractionation cannot be achieved without some additional separation processes.

Current practices for $CO_2$ I ethane separation includes various methods. For example, a heavy component (lean oil) can be added, which preferentially absorbs the ethane. This is called "extractive distillation." As another example, two-pressure fractionation can be used to exploit the small difference in the azeotropic composition between different pressures, for example, using two fractionators to fractionate at both 4,137 kPa and 689.5 kPa. However, this technique utilizes a very large recycle stream and large fractionation systems. Further, the compressors needed to move from the low pressure to the high pressure column make the technique very energy intensive. Methods to exploit other physical and chemical properties can be used in conjunction with fractionation to achieve separation. These methods may include the use of amines in a chemical reaction with $CO_2$, gas permeation membranes, or molecular sieves.

For example, U.S. Pat. No. 4,246,015, to Styring, discloses a method for separating $CO_2$ and ethane based on washing ethane from frozen $CO_2$. The separation is accomplished by freezing the $CO_2$ in a $CO_2$ and ethane mixture and washing the ethane from the solid $CO_2$ with a liquid hydrocarbon, e.g., lean oil, having at least three carbon atoms. The freezing process may be preceded by distillation of a $CO_2$-ethane mixture to form an azeotropic mixture. A subsequent distillation may be used to separate the wash hydrocarbon from the $CO_2$. In addition, if desired, the ethane-wash hydrocarbon mixture may be similarly separated in a subsequent distillation stage. However, the use of lean oil results in the contamination of the ethane, and utilizes large amounts of heat for regenerating the lean oil. Further, high lean oil circulation rates are needed, and the ethane is not able to be completely recovered.

U.S. Patent Application Publication No. 2002/0189443, by McGuire, discloses a method of removing $CO_2$ or hydrogen sulfide ($H_2S$) from a high pressure mixture with methane. The high pressure mixture is expanded through a flow channel having a convergent section followed by a divergent section with an intervening throat that functions as an aerodynamic expander. The flow channel is operated at temperatures low enough to result in the formation of solid $CO_2$ and solid $H_2S$ particles, which increases the efficiency of $CO_2$ and $H_2S$ removal. However, such techniques rely on the use of a high pressure mixture with a high proportion of methane and a relatively low proportion of $CO_2$. In some cases, it may be desirable to remove $CO_2$ from a mixture that contains a large proportion of $CO_2$, e.g., more than around 40% $CO_2$.

International Patent Publication No. WO/2008/095258, by Hart, discloses a method for decreasing the concentration of $CO_2$ in a natural gas feed stream containing ethane and C3+ hydrocarbons. The process involves cooling the natural gas feed stream under a first set of conditions to produce a liquid stream including $CO_2$, ethane, and C3+ hydrocarbons and a gas stream having a reduced $CO_2$ concentration. The liquid stream is separated from the gas stream, and C3+ hydrocarbons may be separated from the liquid stream. The gas stream is then cooled under a second set of conditions to produce a sweetened natural gas stream and a second liquid containing liquid $CO_2$ and/or $CO_2$ solids. The sweetened natural gas stream is separated from the second liquid. However, this technique relies on the use of amines, membranes, and molecular sieves, which release the $CO_2$ as a vapor at low pressure and increase the cost of disposal.

International Patent Publication No. WO/2009/084945, by Prast, discloses a method and assembly for removing and solidifying $CO_2$ from a fluid stream. The assembly has a cyclonic fluid separator with a tubular throat portion arranged between a converging fluid inlet section and a diverging fluid outlet section and a swirl creating device. The separation vessel has a tubular section positioned on and in connection with a collecting tank. A fluid stream with $CO_2$ is injected into the separation assembly. A swirling motion is imparted to the fluid stream so as to induce outward movement. The swirling fluid stream is then expanded such that components of $CO_2$ in a meta-stable state within the fluid stream are formed. Subsequently, the outward fluid stream with the components of $CO_2$ is extracted from the cyclonic fluid separator and provided as a mixture to the separation vessel. The mixture is then guided through the tubular section towards the collecting tank, while providing processing conditions such that solid $CO_2$ is formed. Finally, solidified $CO_2$ is extracted. However, this technique may not provide for an acceptable degree of separation of the $CO_2$, since the $CO_2$ may form an azeotrope with the other components of the fluid stream as the fluid stream flows through the tubular section towards the collecting tank.

SUMMARY

An embodiment described herein provides a method for separating carbon dioxide from heavy hydrocarbons. The method includes cooling a first liquid stream including carbon dioxide and heavy hydrocarbons within an oscillatory crystallization unit to generate carbon dioxide solids and a second liquid stream including the heavy hydrocarbons. The method also includes separating the carbon dioxide solids from the second liquid stream via a solid-liquid separation system.

Another embodiment provides a system for separating carbon dioxide from heavy hydrocarbons. The system includes an oscillatory crystallization unit configured to cool a first liquid stream including carbon dioxide and heavy hydrocarbons to generate carbon dioxide solids and a second liquid stream including the heavy hydrocarbons. The system also includes a solid-liquid separation system configured to separate the carbon dioxide solids from the second liquid stream.

Another embodiment provides a system for removing carbon dioxide from natural gas liquids. The system includes a methane separation system configured to separate methane from a liquid stream including carbon dioxide and natural gas liquids. The system includes a heat exchanger configured to cool the liquid stream to a temperature that is slightly above a freezing point of the carbon dioxide and a pressure reducing device configured to reduce a pressure of the liquid stream. The system also includes a continuous oscillatory baffled crystallizer configured to generate carbon dioxide solids and a natural gas liquids stream by radially cooling the liquid stream to a temperature that is below the freezing point of the carbon dioxide. The system further includes a solid-liquid separation system configured to separate the carbon dioxide solids from the natural gas liquids stream.

BRIEF DESCRIPTION OF THE DRAWINGS

The advantages of the present techniques are better understood by referring to the following detailed description and the attached drawings, in which.

DETAILED DESCRIPTION

Figure 1:
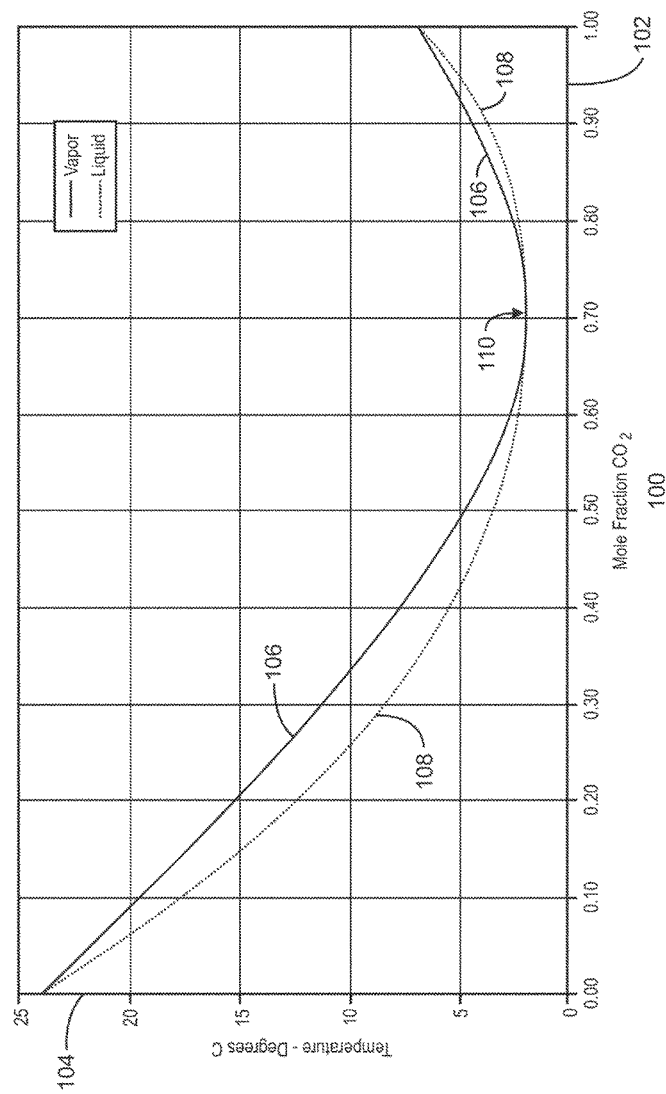
FIG. 1 is a temperature-composition phase plot showing the equilibrium concentrations of carbon dioxide ($CO_2$) in a mixture with ethane at 4,137 kPa.
Figure 2:
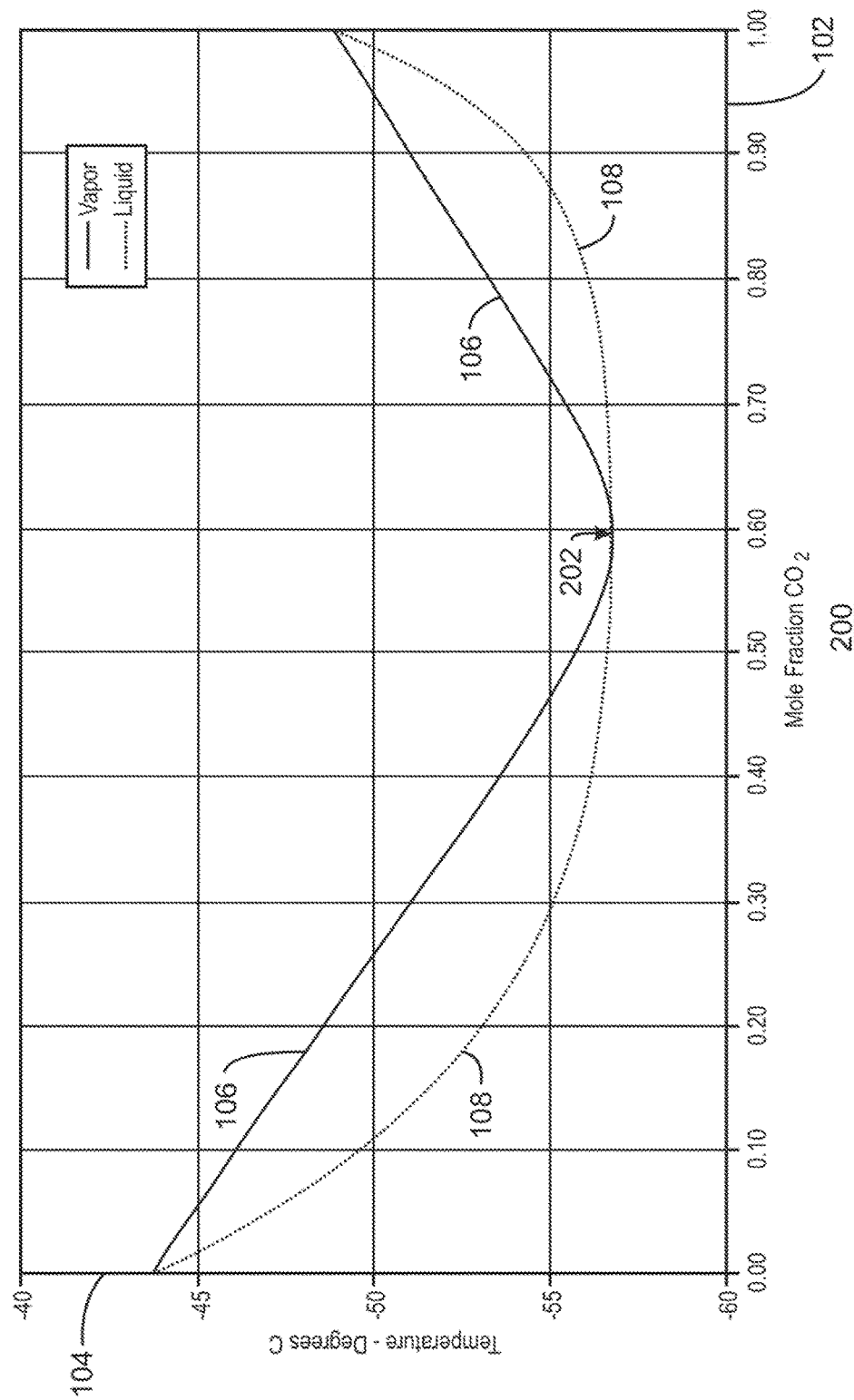
FIG. 2 is a temperature-composition phase plot showing the equilibrium concentrations of $CO_2$ in a mixture with ethane at 689.5 kPa.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described herein, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Acid gases" are contaminants that are often encountered in natural gas streams. Typically, these gases include carbon dioxide ($CO_2$) and hydrogen sulfide ($H_2S$), although any number of other contaminants may also form acids. Acid gases are commonly removed by contacting the gas stream with an absorbent, such as an amine, which may react with the acid gas. When the absorbent becomes acid-gas "rich," a desorption step can be used to separate the acid gases from the absorbent. The "lean" absorbent is then typically recycled for further absorption. As used herein a "liquid acid gas stream" is a stream of acid gases that are condensed into the liquid phase, for example, including $CO_2$ dissolved in $H_2S$ and vice-versa.

An "azeotrope" or "azeotropic mixture" is a system of two or more components in which the liquid composition and vapor composition are equal at a certain pressure and temperature. In practice, this means that the components of an azeotropic mixture are constant-boiling at that pressure and temperature and generally cannot be separated during a phase change.

As used herein, a "column" is a separation vessel in which a counter current flow is used to isolate materials on the basis of differing properties. In an absorbent column, a physical solvent is injected into the top, while a mixture of gases to be separated is flowed through the bottom. As the gases flow upwards through the falling stream of absorbent, one gas species is preferentially absorbed, lowering its concentration in the vapor stream exiting the top of the column. In a fractionation column, liquid and vapor phases are counter-currently contacted to effect separation of a fluid mixture based on boiling points or vapor pressure differences. The high vapor pressure, or lower boiling, component will tend to concentrate in the vapor phase whereas the low vapor pressure, or higher boiling, component will tend to concentrate in the liquid phase.

"Compressor" refers to a device for compressing a working gas, including gas-vapor mixtures or exhaust gases. Compressors can include pumps, compressor turbines, reciprocating compressors, piston compressors, rotary vane or screw compressors, and devices and combinations capable of compressing a working gas.

As used herein, the term "Controlled Freeze Zone (CFZ) process" generally refers to a process whereby acid gas components are separated by cryogenic distillation through the controlled freezing and melting of $CO_2$ in a single column, without the use of freeze-suppression additives. The CFZ process uses a cryogenic distillation column with a special internal section (CFZ section) to handle the solidification and melting of CO2. This CFZ section does not contain packing or trays like conventional distillation columns. Instead, it contains one or more spray nozzles and a melting tray. Solid $CO_2$ forms in the vapor space in the distillation column and falls into the liquid on the melting tray. Substantially all of the solids that form are confined to the CFZ section. The portions of the distillation tower above and below the CFZ section of the tower are similar to conventional cryogenic demethanizer columns.

As used herein, "cooling" broadly refers to lowering and/or dropping a temperature and/or internal energy of a substance, such as by any suitable amount. Cooling may include a temperature drop of at least about 1° C., at least about 5° C., at least about 10° C., at least about 15° C., at least about 25° C., at least about 50° C., at least about 100° C., and/or the like. The cooling may use any suitable heat sink, such as steam generation, hot water heating, cooling water, air, refrigerant, other process streams (integration), and combinations thereof. One or more sources of cooling may be combined and/or cascaded to reach a desired outlet temperature. The cooling step may use a cooling unit with any suitable device and/or equipment. According to one embodiment, cooling may include indirect heat exchange, such as with one or more heat exchangers. Heat exchangers may include any suitable design, such as shell and tube, plate and frame, counter current, concurrent, extended surface, and/or the like. In the alternative, the cooling may use evaporative (heat of vaporization) cooling and/or direct heat exchange, such as a liquid sprayed directly into a process stream.

"Cryogenic distillation" has been used to separate $CO_2$ from methane since the relative volatility between methane and $CO_2$ is reasonably high. The overhead vapor is enriched with methane and the bottoms product is enriched with $CO_2$ and other heavier hydrocarbons. Cryogenic distillation processing requires the proper combination of pressure and temperature to achieve the desired product recovery.

"Cryogenic temperature" refers to a temperature that is about −50° C. or below.

A "facility" as used herein is a representation of a tangible piece of physical equipment through which hydrocarbon fluids are either produced from a reservoir or injected into a reservoir. In its broadest sense, the term facility is applied to any equipment that may be present along the flow path between a reservoir and the destination for a hydrocarbon product. Facilities may comprise production wells, injection wells, well tubulars, wellhead equipment, gathering lines, manifolds, pumps, compressors, separators, surface flow lines, and delivery outlets. In some instances, the term "surface facility" is used to distinguish those facilities other than wells. A "facility network" is the complete collection of facilities that are present in the model, which would include all wells and the surface facilities between the wellheads and the delivery outlets.

The term "gas" is used interchangeably with "vapor," and means a substance or mixture of substances in the gaseous state as distinguished from the liquid or solid state. Likewise, the term "liquid" means a substance or mixture of substances in the liquid state as distinguished from the gas or solid state.

"Heat exchanger" refers to any equipment arrangement adapted to allow the passage of heat energy from one or more streams to other streams. The heat exchange may be either direct (e.g., with the streams in direct contact) or indirect (e.g., with the streams separated by a mechanical barrier). The streams exchanging heat energy may be one or more lines of refrigerant, heating, or cooling utilities, one or more feed streams, or one or more product streams. Examples include a shell-and-tube heat exchanger, a cryogenic spool-wound heat exchanger, or a brazed aluminum-plate fin type, among others.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to organic materials that are harvested from hydrocarbon containing sub-surface rock layers, termed reservoirs. For example, natural gas is normally composed primarily of the hydrocarbon methane.

The term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($C_1$) as a significant component. Raw natural gas will also typically contain ethane ($C_2$), higher molecular weight hydrocarbons, one or more acid gases (such as $CO_2$, $H_2S$, carbonyl sulfide, carbon disulfide, and mercaptans), and minor amounts of contaminants such as water, helium, nitrogen, iron sulfide, wax, and crude oil.

As used herein, "natural gas liquids" (NGL) refer to mixtures of hydrocarbons whose components are, for example, typically heavier than ethane. Some examples of hydrocarbon components of NGL streams include propane, butane, and pentane isomers, benzene, toluene, and other aromatic compounds.

As used herein, the term "oscillatory crystallization unit" refers to a cylindrical tube or column containing baffles in which a liquid is oscillated axially by means of a diaphragm, bellows, piston, or other device located at one or both ends of the tube. More specifically, a "continuous oscillatory baffled crystallizer (COBC)" is an oscillatory crystallization unit in which the degree of mixing of the liquid is governed by the frequency and magnitude of the induced oscillations and the size, number, and type of the baffles within the unit. A COBC may be operated horizontally, vertically, or at any angle, and may include a circuitous tube or a single straight tube, for example.

"Pressure" is the force exerted per unit area by the gas on the walls of the volume. Pressure can be shown as pounds per square inch (psi). "Atmospheric pressure" refers to the local pressure of the air. "Absolute pressure" (psia)" refers to the sum of the atmospheric pressure (14.7 psia at standard conditions) plus the gauge pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning. For a pure component in an enclosed system at a given pressure, the component vapor pressure is essentially equal to the total pressure in the system.

The "Ryan-Holmes process" is a process by which methane and $CO_2$ are separated in a distillation column. The Ryan-Holmes process involves operation of the distillation column at temperatures, compositions, and pressures that produce a solids potential zone for $CO_2$ within the column. The term "solids potential zone" is used with the Ryan-Holmes process because, although conditions in the tower are such that $CO_2$ solids would normally occur, the Ryan-Holmes process prevents actual solids formation from occurring. This is achieved by introducing into the upper portion of the distillation column an additive to suppress formation of acid gas solids. The Ryan-Holmes additive, which is a non-polar material that is miscible with methane, may include ethane, propane, butane, pentane, and mixtures thereof. After the methane/$CO_2$ separation, the additive is recovered in another distillation column.

A "separation vessel" is a vessel wherein an incoming feed is separated into individual vapor and liquid fractions. A separation vessel may include a flash drum in which a stream is flashed to form vapor and liquid components. The vapor component is removed from an upper outlet, while the liquid component is removed from a lower outlet.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

"Well" or "wellbore" refers to a hole in the subsurface made by drilling or insertion of a conduit into the subsurface. The terms are interchangeable when referring to an opening in the formation. A well may have a substantially circular cross section, or other cross-sectional shapes (for example, circles, ovals, squares, rectangles, triangles, slits, or other regular or irregular shapes). Wells may be cased, cased and cemented, or open-hole well, and may be any type, including, but not limited to a producing well, an experimental well, an exploratory well, or the like. A well may be vertical, horizontal, or any angle between vertical and horizontal (a deviated well), for example a vertical well may comprise a non-vertical component.

Overview

Techniques described herein relate to the separation of a liquid hydrocarbon stream including $CO_2$ and NGLs into its respective components. Specifically, an oscillatory crystallization unit is used to form $CO_2$ solids, which are then separated from the NGLs using a solid-liquid separation system. The oscillatory crystallization unit may gradually cool the liquid stream via radial mixing. This may provide for a substantially complete separation of the $CO_2$ from the NGLs by preventing the formation of an azeotrope. This process may be further understood with respect to FIG. 3.

Figure 3:
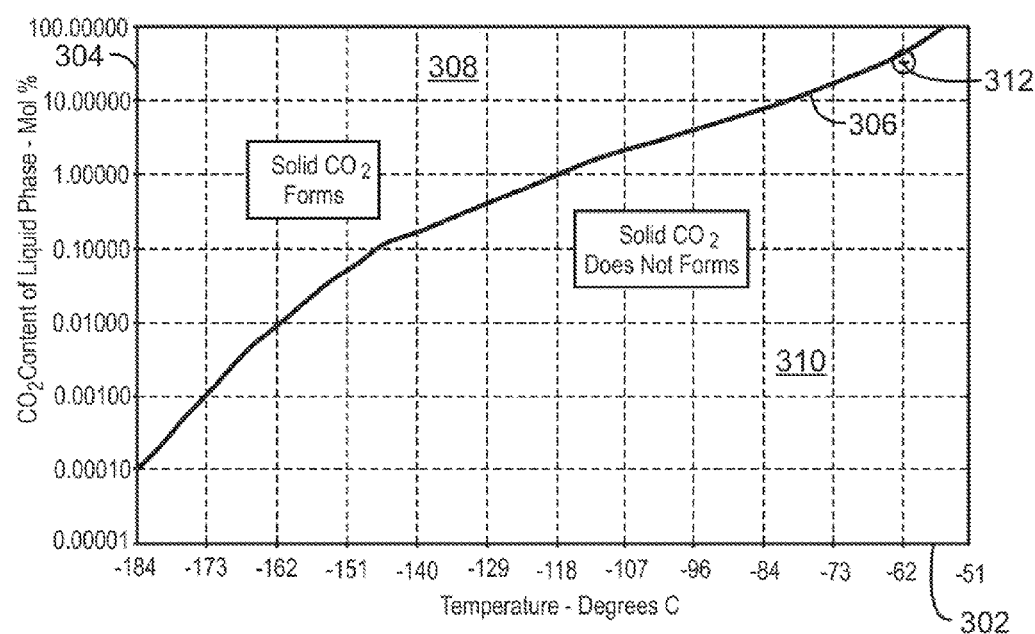
FIG. 3 is a plot of the freezing conditions used to form solid $CO_2$ in a mixture with a hydrocarbon.

FIG. 3 is a plot 300 of the freezing conditions used to form solid $CO_2$ in a mixture with a hydrocarbon. In the plot 300, the x-axis 302 represents the temperature of the mixture in degrees Fahrenheit, while the y-axis 304 represents the $CO_2$ content of the liquid phase in mol %. The line 306 on the plot 300 represents a division between a first region 308 in which solid $CO_2$ forms, and a second region 310 in which solid $CO_2$ does not form. As shown at point 312 in the plot 300, at temperatures of about −62° C., solid $CO_2$ forms from a 70% I 30%:$CO_2$ I ethane mixture. Ethane, however, does not freeze, but will be either a vapor or liquid, depending on the pressure, temperature, and residual $CO_2$ level. The solid will be nearly pure $CO_2$, resulting in the separation of the $CO_2$ and the ethane.

Systems for Separating $CO_2$ from NGLs

Figure 4:
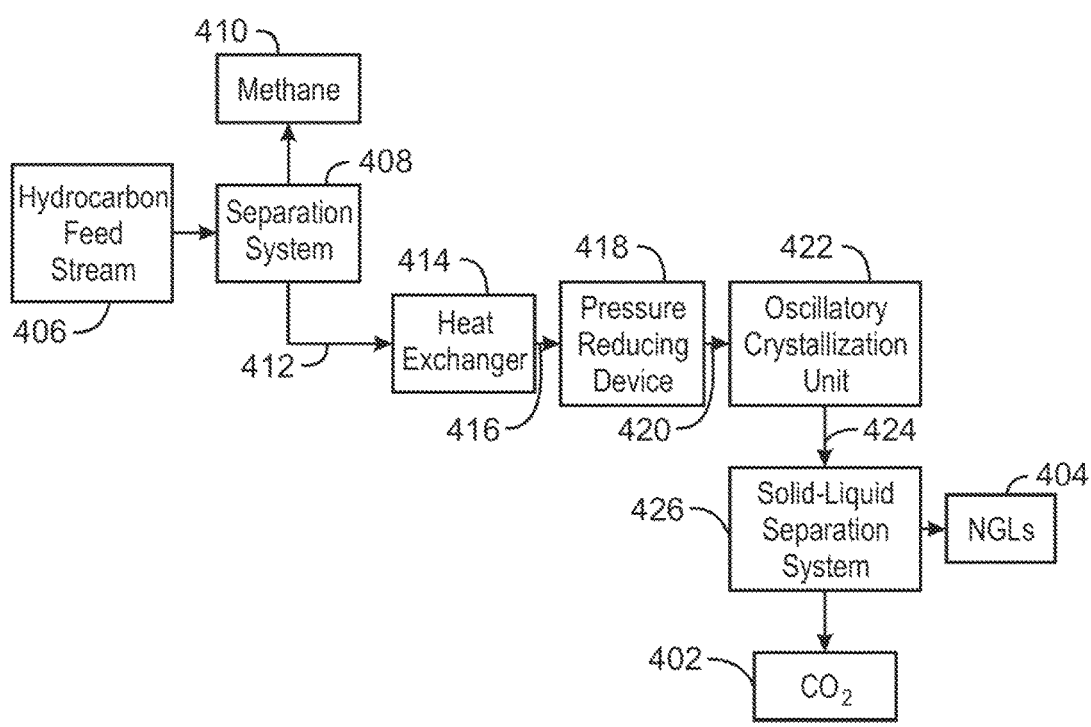
FIG. 4 is a block diagram of a system that can be used to separate $CO_2$ from natural gas liquids (NGLs)

FIG. 4 is a block diagram of a system 400 that can be used to separate $CO_2$ 402 from NGLs 404. The resulting NGLs 404, which include ethane and heavier hydrocarbons, may be exported and used as fuel. In addition, the resulting $CO_2$ 402 may be used for enhanced oil recovery (EOR) operations or commercial sales, for example.

Within the system 400, a hydrocarbon feed stream 406 may be fed to a separation system 408. The hydrocarbon feed stream 406 may be a raw hydrocarbon feed stream obtained directly from one or more production wells. Alternatively, the hydrocarbon feed stream 406 may be a hydrocarbon feed stream that has been dehydrated within a dehydration unit. Such a dehydration unit may include any system that is capable of removing water vapor from a raw hydrocarbon feed stream using glycol dehydration, desiccants, or pressure swing adsorption (PSA) techniques, among others. The removal of water from the hydrocarbon feed stream 406 may prevent the water from freezing or plugging downstream cryogenic separation systems.

The separation system 408 may use any number of processes to separate methane 410 from various other components within the hydrocarbon feed stream 406, including heavy hydrocarbons, e.g., $C_2$ and higher hydrocarbons, $CO_2$ 402, $H_2S$, and other acid gases. The separation system 408 may include a methane separation column, a bulk fractionator, a physical solvent system, or a cryogenic distillation unit, such as, for example, a Ryan-Holmes column or a CFZ column. In addition, any number of other systems may be used for the separation process. For example, any type of warm gas processing system may be used.

The separation of the methane 410 from the other components within the hydrocarbon feed stream 406 may result in the generation of a liquid stream 412 including the $CO_2$ 402 and the heavy hydrocarbons, which may combine to form NGLs 404, as well as $H_2S$ and other acid gases. The $CO_2$ 402 and the NGLs 404 within the liquid stream 412 may form an azeotropic mixture, making separation of the two components difficult.

The methane 410 may be flowed out of the separation system 408 via an overhead line, and the liquid stream 412 may be flowed out of the separation system 408 via a bottoms line. The liquid stream 412 exiting the separation system 408 may be at a temperature that is approaching the boiling point of the $CO_2$ 402. For example, the liquid stream 412 may be at temperature that is between about $-1°$ C. (about 30° F.) to about 10° C. (about 50° F.).

From the separation system 408, the liquid stream 412 may be flowed through a heat exchanger 414. The heat exchanger 414 may cool the liquid stream 412 to a temperature that is at least slightly above the freezing point of the $CO_2$ 402. For example, the heat exchanger 414 may cool the liquid stream 412 to about $-62°$ C. (about $-80°$ F.). The heat exchanger 414 may be any type of chilling device, such as a shell-and-tube heat exchanger, a brazed aluminum heat exchanger, a double pipe heat exchanger, or a chiller bundle heat exchanger, among others. In addition, the heat exchanger 414 may utilize any suitable type of cooling fluid to cool the liquid stream 412 via indirect heat exchange, such as an ammonia stream, a propane stream, or a process stream for another stage of the process.

The resulting low-temperature liquid stream 416 may be flowed from the heat exchanger 414 to a pressure reducing device 418. In various embodiments, the cooling of the liquid stream 412 within the heat exchanger 414 prevents flashing of the resulting low-temperature liquid stream 416 within the pressure reducing device 418. The pressure reducing device 418 may lower the pressure of the low-temperature liquid stream 416 to prepare for the formation of $CO_2$ solids, since $CO_2$ is more likely to undergo a phase change from liquid to solid under low pressures. The pressure reducing device 418 may be any suitable type of throttling valve.

From the pressure reducing valve 418, the resulting low-pressure liquid stream 420 may be flowed into an oscillatory crystallization unit 422. The oscillatory crystallization unit 422 may radially mix the low-pressure liquid stream 420 to gradually cool the low-pressure liquid stream 420 below the freezing point of the $CO_2$ 402. For example, the oscillatory crystallization unit 422 may cool the low-pressure liquid stream 420 via indirect heat exchange with any suitable type of cooling fluid. In various embodiments, the oscillatory crystallization unit 422 is a COBC, such as either a circuitous COBC or a simple vertical COBC, as discussed further with respect to FIGS. 8 and 9.

Cooling the low-pressure liquid stream 420 below the freezing point of the $CO_2$ 402 results in the formation of $CO_2$ solids within the low-pressure liquid stream 420. The vibration and mixing of the low-pressure liquid stream 420 in the oscillatory crystallization unit 422 may prevent the $CO_2$ solids from adhering to the walls, ensuring that the $CO_2$ solids continue to flow and do not plug the unit.

From the oscillatory crystallization unit 422, the multiphase stream 424 may be flowed into a solid-liquid separation system 426. The solid-liquid separation system 426 may separate the multiphase stream 424 into the $CO_2$ 402 and the NGLs 404. This may be accomplished via any of a number of different separation techniques. For example, the solid-liquid separation device 426 may include a gravity separation device, a cyclonic separation device, or a filtering device, among others.

The $CO_2$ 402 may be flowed out of the solid-liquid separation system 426 as a bottoms stream in either a liquid phase or a solid phase, depending on the details of the specific implementation. If the $CO_2$ 402 is in the solid phase, some amount of the NGLs 404 may be used as a carrier fluid for the $CO_2$ solids. In addition, the NGLs 404 may be flowed out of the solid-liquid separation system 426 as an overhead stream. $H_2S$ and any other acid gases or residual components within the multiphase stream 424 may also be removed with the NGLs 404.

The block diagram of FIG. 4 is not intended to indicate that the system 400 is to include all the components shown in FIG. 4. Further, any number of additional components not shown in FIG. 4 may be included within the system 400.

The system 400 discussed herein may be suitable for the removal of an acceptable proportion of the $CO_2$ from a liquid stream 412 that has an initial concentration of about 60% $CO_2$ 402 and about 40% NGLs 404, or about 70% $CO_2$ 402 and about 30% NGLs 404, for example. However, if the liquid stream 412 has an initial concentration of about 90% $CO_2$ 402 and 10% NGLs 404, or around 92% $CO_2$ 402 and 8% NGLs 404, the resulting NGLs 404 may still contain an unacceptably high proportion of $CO_2$. In such cases, additional separation techniques may be employed, as discussed further with respect to FIG. 5. Further, in various embodiments, the degree of separation of the $CO_2$ 402 from the NGLs 404 is adjusted such that the multiphase stream 424 has a sufficient amount of liquid to carry the solid $CO_2$ out of the oscillatory crystallization unit 422 and into the solid-liquid separation system 426.

Figure 5:
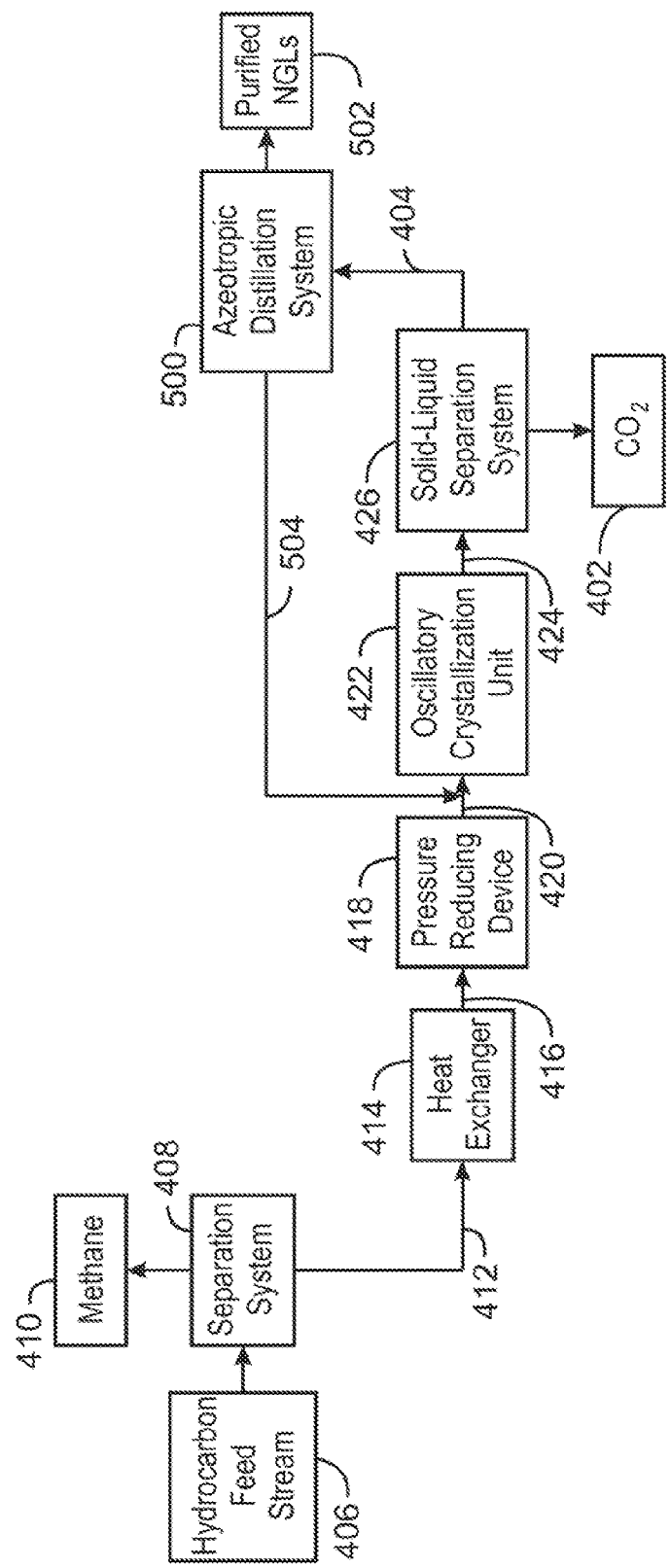
FIG. 5 is a block diagram of the system of FIG. 4 with the addition of an azeotropic distillation system.

FIG. 5 is a block diagram of the system 400 of FIG. 4 with the addition of an azeotropic distillation system 500. Like numbered items are as described with respect to FIG. 4. The azeotropic distillation system 500 may separate residual $CO_2$ from the NGLs 404 exiting the solid-liquid separation system 426. More specifically, the azeotropic distillation system 500 may generate purified NGLs 502 and an azeotropic mixture 504 including $CO_2$ and some amount of the NGLs 404.

The azeotropic mixture 504 may be flowed back into the system 400 upstream of the oscillatory crystallization unit 422. Thus, the azeotropic mixture 504 may be combined with the low-pressure liquid stream 420, and $CO_2$ solids may be formed from the combined liquid stream within the oscillatory crystallization unit 422. According to this technique, the NGLs 404 may be continuously purified until they contain an acceptably low proportion of $CO_2$.

In some embodiments, the azeotropic mixture 504 is flowed back into the system 400 upstream of the heat exchanger 414. The azeotropic mixture 504 may be combined with the liquid stream 412 exiting the separation system 408, and may be used to aid in the cooling of the liquid stream 412 prior to entry into the heat exchanger 414. This may reduce the heat duty of the heat exchanger 414, resulting in cost savings.

The block diagram of FIG. 5 is not intended to indicate that the system 400 is to include all the components shown in FIG. 5. Further, any number of additional components not shown in FIG. 5 may be included within the system 500.

Figure 6:
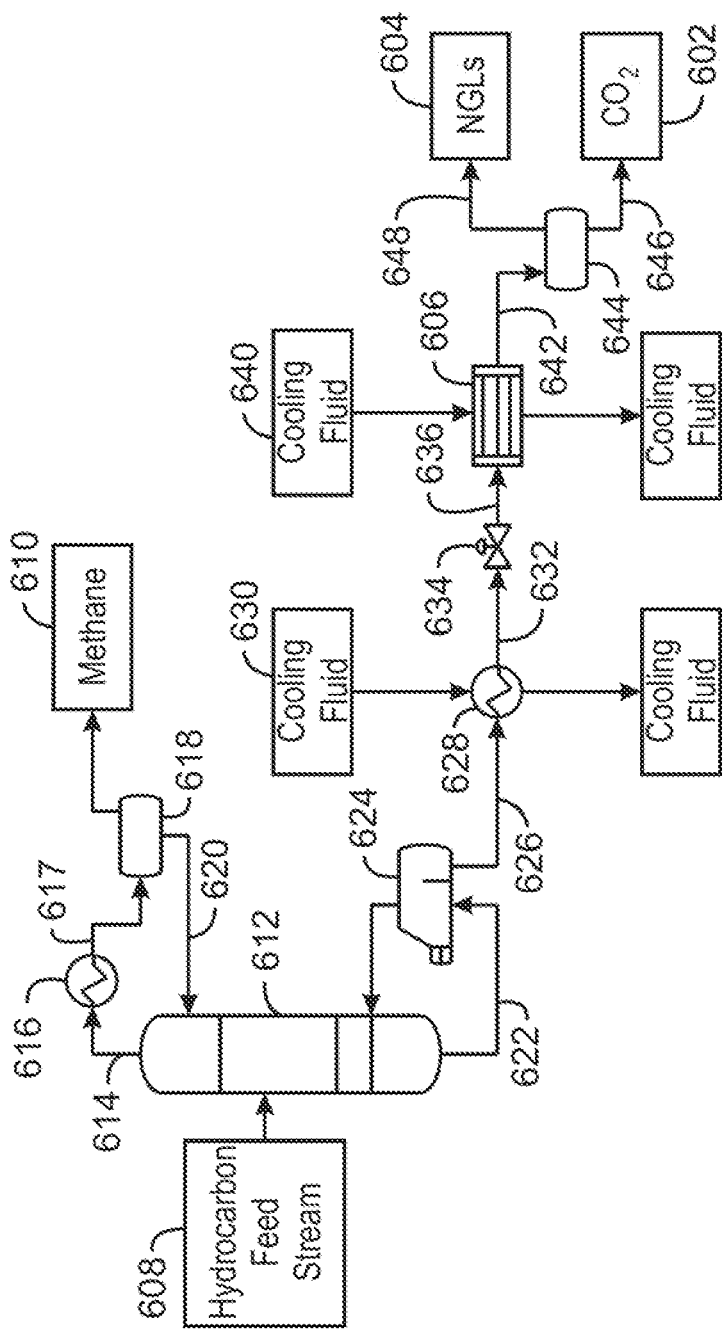
FIG. 6 is a process flow diagram of a system that can be used to separate $CO_2$ from NGLs using a continuous oscillatory baffled crystallizer (COBC)

FIG. 6 is a process flow diagram of a system 600 that can be used to separate $CO_2$ 602 from NGLs 604 using a COBC 606. A hydrocarbon feed stream 608 may be flowed into the system 600 directly from one or more production wells, or from a dehydration unit, for example. The hydrocarbon feed stream 608 may include methane 610, ethane and heavier hydrocarbons, $CO_2$ 602, $H_2S$ and other acid gases, and any other residual contaminants.

The hydrocarbon feed stream 608 may be injected into a cryogenic fractionation column 612. The cryogenic fractionation column 612 may be a CFZ column or a Ryan-Holmes column, for example. The cryogenic fractionation column 612 may separate the methane 610 from the ethane and heavier hydrocarbons, $CO_2$ 602, and other components within the hydrocarbon feed stream 608.

The methane 610 may be flowed out of the distillation fractionation column 612 as an overhead stream 614. The overhead stream 614 may also include other low boiling point or non-condensable gases, such as nitrogen and helium. The overhead stream 614 may be flowed through a condenser 616, which may condense the overhead stream 614, producing a cooled methane stream 617. The cooled methane stream 617 may then be flowed into a reflux drum 618. From the reflux drum 618 a portion of the cooled methane stream 617 may be flowed out of the system 600 as a methane stream 610, and the remaining portion of the cooled methane stream 617 may be reinjected into the cryogenic fractionation column 612 as a reflux stream 620 to aid in the separation process.

The ethane and heavier hydrocarbons, $CO_2$ 602, and other components within the hydrocarbon feed stream 608 may be flowed out of the cryogenic fractionation column 612 as a bottoms stream 622. The bottoms stream 622 may then be heated within a reboiler 624, and a portion of the heated bottoms stream 622 may be returned to the cryogenic fractionation column 612 to provide heating. The remaining portion of the heated bottoms stream 622 may be a liquid stream 626 from which separate ethane and $CO_2$ streams are to be generated.

The liquid stream 626 may be flowed into a heat exchanger 628. The heat exchanger 628 may be a shell-and-tube heat exchanger, a brazed aluminum heat exchanger, a double pipe heat exchanger, or a chiller bundle heat exchanger, among others. The heat exchanger 628 may pre-cool the liquid stream via indirect heat exchange with a cooling fluid 630. In some embodiments, the heat exchanger 628 cools the liquid stream 626 to a temperature that is slightly above the freezing point of $CO_2$.

The resulting high-temperature liquid stream 632 may be flowed through a pressure reducing device 634. The pressure reducing device 634 may be any type of device or valve that is capable of decreasing the pressure of the high-temperature liquid stream 632, producing a low-pressure liquid stream 636.

The low-pressure liquid stream 636 may be flowed into the COBC 606. The COBC 606 may radially cool the high-temperature liquid stream 632 to a temperature that is below the freezing point of the $CO_2$ 602 via indirect heat exchange with a cooling fluid 640. Further, the COBC 606 may use vibrations to prevent the $CO_2$ solids from freezing on the sides, agglomerating, or plugging the COBC 606. The COBC 606 provides a multiphase stream 642 including $CO_2$ solids and NOLs.

The multiphase stream 642 may be flowed into a solid-liquid separation system 644. The solid-liquid separation system 644 may be a cyclonic separator or a separation column, among others. The solid-liquid separation system 644 may remove the $CO_2$ solids from the NGLs. The $CO_2$ 602 may be flowed out of the solid-liquid separation system 644 via a bottoms line 646, and the NGLs 604 may be flowed out of the solid-liquid separation system 644 via an overhead line 648. In addition, $H_2S$ or other acid gases within the multiphase stream 642 may be flowed out of the overhead line 648 along with the NGLs 604.

The process flow diagram of FIG. 6 is not intended to indicate that the system 600 is to include all the components shown in FIG. 6. Further, any number of additional components not shown in FIG. 6 may be included within the system 600. For example, the system 600 may include a recirculation system, as discussed further with respect to FIG. 6.

Figure 7:
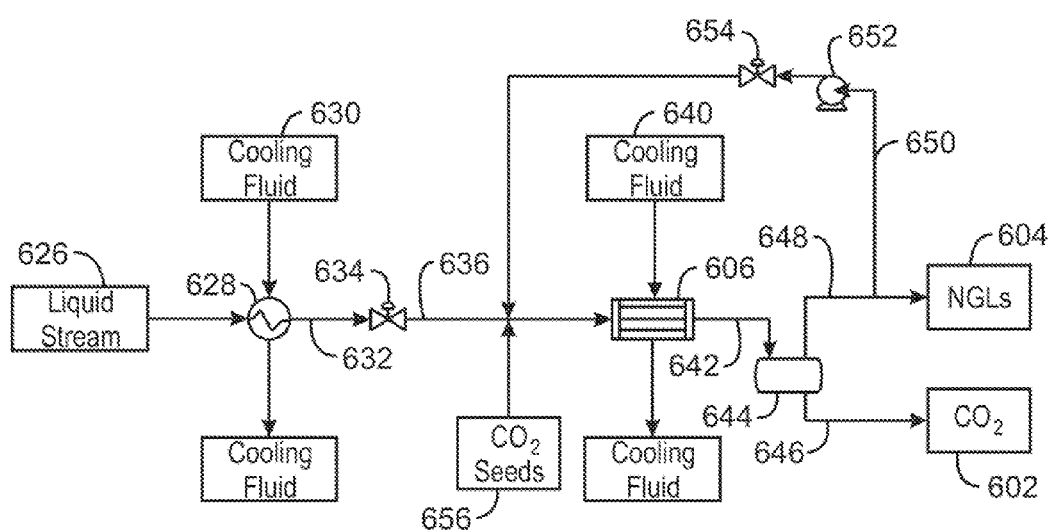
FIG. 7 is a process flow diagram of the system of FIG. 6 with the addition of a recirculation system for increasing the degree of separation of the $CO_2$ and the NGLs.

FIG. 7 is a process flow diagram of the system 600 of FIG. 6 with the addition of a recirculation system for increasing the degree of separation of the $CO_2$ 602 and the NGLs 604. Like numbered items are as described with respect to FIG. 6. The recirculation system may be useful for instances in which the proportion of $CO_2$ in the low-pressure liquid stream 636 is high. In such instances, the COBC 606 may not be able to crystallize all of the $CO_2$ in the low-pressure liquid stream 636 in one pass. Therefore, it may be desirable to reduce the proportion of $CO_2$ in the low-pressure liquid stream 636 by flowing a portion of the NGLs 604 within the overhead line 648 back into the system 600 upstream of the COBC 606.

Specifically, a portion of the NGLs 604, e.g., a recycle stream 650, may be pumped back into the system 600 upstream of the COBC 606 via a pump 652. In addition, the pressure of the recycle stream 650 may be reduced via a pressure reducing device 654. The recycle stream 650 may then be combined with the low-pressure liquid stream 636. This may reduce the proportion of $CO_2$ in the low-pressure liquid stream 636. As a result, the COBC 606 may be able to more effectively handle the low-pressure liquid stream 636, since the weight percentage of the resulting $CO_2$ solids may not be as high.

Further, in some embodiments, $CO_2$ seeds 656 may be added to the low-pressure liquid stream 636 prior to entry into the COBC 606. The $CO_2$ seeds 656 may aid in the crystallization of the $CO_2$ within the low-pressure liquid stream 636.

Figure 8:
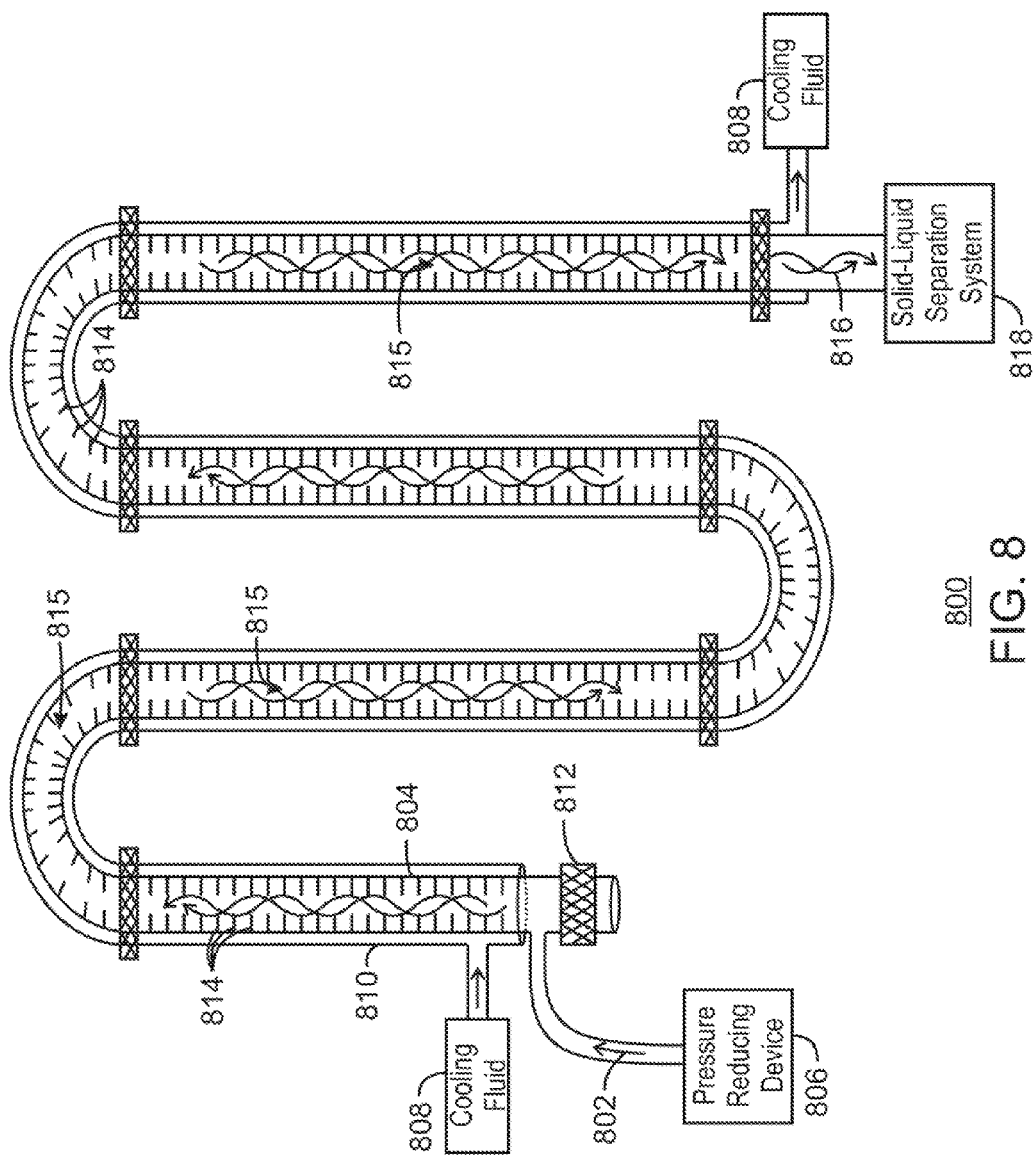
FIG. 8 is a schematic of a circuitous COBC that can be used to form $CO_2$ solids.

FIG. 8 is a schematic of a circuitous COBC 800 that can be used to form $CO_2$ solids. The circuitous COBC 800 may be implemented within any of the systems 400 or 500 discussed with respect to FIG. 4, 5, 6, or 7. In various embodiments, the circuitous COBC 800 may produce $CO_2$ solids within a liquid stream 802 that includes $CO_2$ and NGLs.

The liquid stream 802 may be flowed into an inner tube 804 of the circuitous COBC 800 from a pressure reducing device 806, for example. In addition, a cooling fluid 808 may be flowed into an outer tube 810 of the circuitous COBC 800. The cooling fluid 808 within the outer tube 810 of the circuitous COBC 800 may be in indirect thermal contact with the liquid stream 802 within the inner tube 804 of the circuitous COBC 800.

The circuitous COBC 800 may include a pump 812. The pump 812 may produce a pulsating flow of the liquid stream 802 within the circuitous COBC 800. In addition, the circuitous COBC 800 may include a number of baffles 814. The baffles 814 may produce a turbulent flow of the liquid stream 802 as the liquid stream 802 contacts each baffle 814 on its path through the circuitous COBC 800. Each baffle 814 may also include a hole 815 in the center that induces a shear force on the liquid stream 802. The size and shape of each baffle 814 may be adjusted according to the flow rate of the liquid stream 802 and the particular characteristics of the circuitous COBC 800.

The pulsations, turbulence, and shear forces may cause the liquid stream 802 to undergo radial mixing as it travels through the circuitous COBC 800. Further, as the liquid stream 802 travels through the circuitous COBC 800, $CO_2$ solids may be formed due to the cooling of the liquid stream 802 via indirect heat exchange with the cooling fluid 808. The radial mixing of the liquid stream 802 may aid in the formation of the $CO_2$ solids. In addition, the radial mixing of the liquid stream 802 may prevent the $CO_2$ solids from adhering to the baffles 814 or the walls of the circuitous COBC 800.

The liquid stream 802 including the $CO_2$ solids may be flowed out of the inner tube 804 of the circuitous COBC 800 as a multiphase stream 816. In addition, the warmed cooling fluid 808 may be flowed out of the outer tube 810 of the circuitous COBC 800, and may be cooled and recycled to the circuitous COBC 800.

Figure 10:
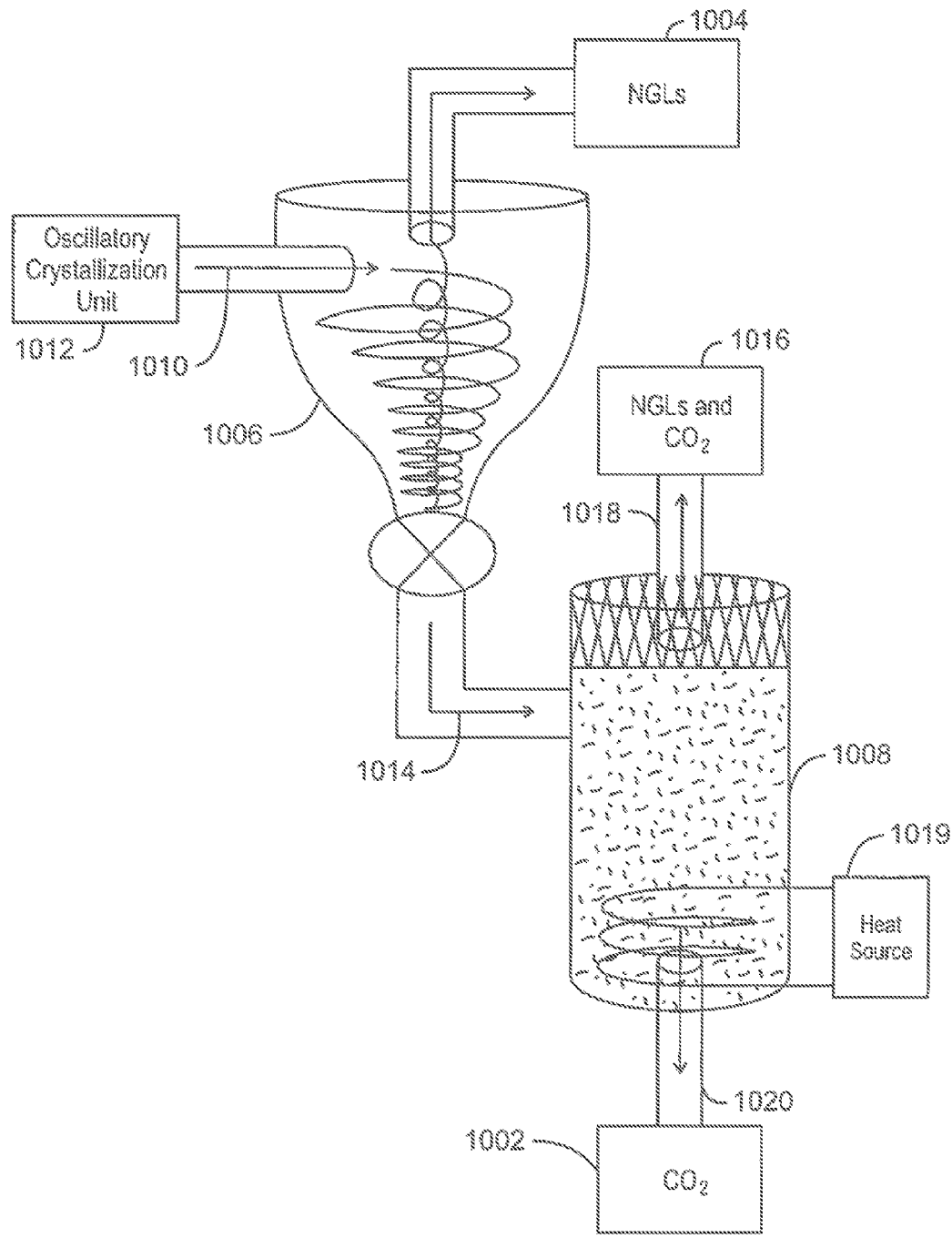
FIG. 10 is a schematic of a cyclonic separator that can used to separate $CO_2$ solids from NGL.

The multiphase stream 816 may be flowed into a solid-liquid separation system 818, which may remove the $CO_2$ solids from the NOLs within the multiphase stream 816, in various embodiments, the solid-liquid separation system 818 is a cyclonic separation, as discussed further with respect to FIG. 10.

Figure 9:
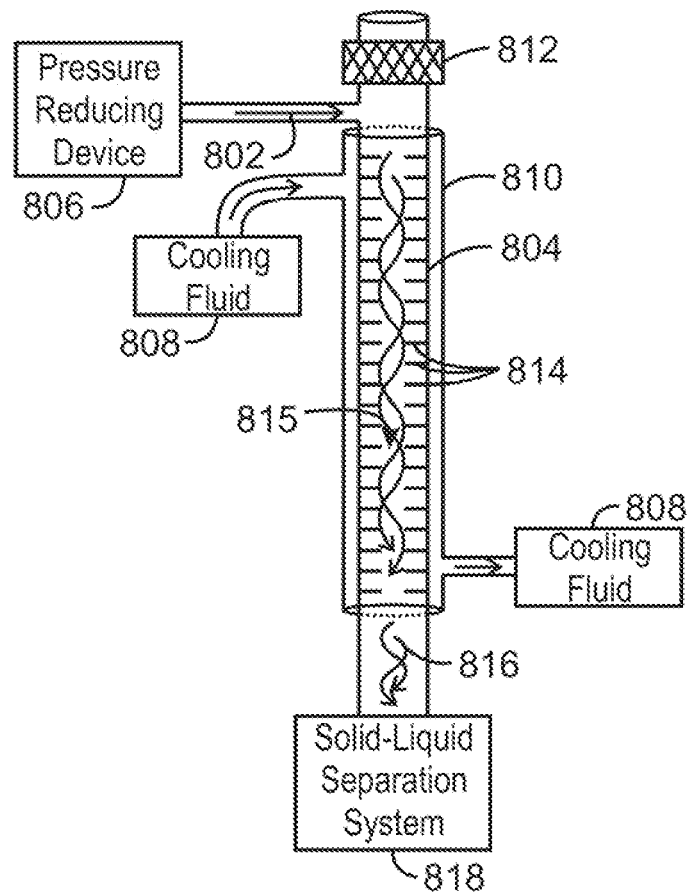
FIG. 9 is a schematic of a vertical COBC that can be used to form $CO_2$ solids.

FIG. 9 is a schematic of a vertical COBC 900 that can be used to form $CO_2$ solids. Like numbered items are as described with respect to FIG. 8. The vertical COBC 900 may be similar to the circuitous COBC 800 discussed with respect to FIG. 8. However, as shown in FIG. 9, the vertical COBC 900 may include a single vertical structure, rather than a circuitous structure.

Further, in various embodiments, the pump 812 of the vertical COBC 900 may be replaced with a thermoacoustic generator. The thermoacoustic generator may produce a pulsating flow of the liquid stream 802 using a resonant frequency in the COBC 900. In addition, the thermoacoustic generator may aid in the cooling of the liquid stream 802.

FIG. 10 is a schematic of a cyclonic separation 1000 that can used to separate $CO_2$ 1002 from NGLs 1004. The cyclonic separation 1000 may be any of the solid-liquid separation systems 426, 644, or 818 discussed with respect to FIGS. 4-9. The cyclonic separation system 1000 may include a cyclonic separator 1006 and a separation vessel 1008.

A multiphase stream 1010 may be flowed into the cyclonic separator 1006 from an oscillatory crystallization unit 1012. The oscillatory crystallization unit 1012 may be the oscillatory crystallization unit 422 discussed with respect to FIGS. 4 and 5, the circuitous COBC 800 discussed with respect to FIG. 6, or the vertical COBC discussed with respect to FIG. 7. The multiphase stream 1010 may include $CO_2$ solids 1014 and NGLs.

As the multiphase stream 1010 enters the cyclonic separator 1006, the location of the inlet line within the cyclonic separator 1006 may impart a radial acceleration and a tangential velocity component to the multiphase stream 1010. A swirl element may be added to impart a further radial acceleration through the rotation of twisted swirl vanes. The swirl vanes may be arranged parallel or in series on the swirl element. The tangential velocity of the multiphase stream 1010 may cause the $CO_2$ solids 1014, which are heavier and denser than the NGLs 1004 within the multiphase stream 1010, to migrate to the outer rim of the cyclonic separator 1006 and begin traveling in a wide circular path. The NGLs 1004 may migrate towards the center of the cyclonic separator 1006 and begin traveling in a narrow circular path. As the multiphase stream 1010 nears the end of the cyclonic separator 1006, the $CO_2$ solids 1014 may be captured and sent out of the bottom of the cyclonic separator 1006, along with a small amount of the NGLs 1004. The majority of the NGLs 1004 may be sent out of the top of the cyclonic separator 1006.

In various embodiments, the $CO_2$ solids 1014 include some amount of residual NGLs. Thus, the $CO_2$ solids 1014 may be flowed into the separation vessel 1008. Within the separation vessel 1008, the $CO_2$ solids 1014 may settle on the bottom of the separation vessel 1008, while the NGLs may settle on the top of the separation vessel 1008 along with some amount of $CO_2$ that was been incorporated into the NGLs.

The NGLs and incorporated $CO_2$ 1016 may be flowed out of the separation vessel via an overhead line 1018. The NGLs and incorporated $CO_2$ 1016 may then be combined with a liquid stream upstream of the oscillatory crystallization unit 1012.

The $CO_2$ solids 1014 that have settled on the bottom of the separation vessel 1008 may be converted to a liquid phase using a heating coil 1019 or other heating device. The liquid $CO_2$ 1002 may then be flowed out of a bottoms line 1020 of the separation vessel 1008.

Method for Separating $CO_2$ from NGLs

Figure 11:
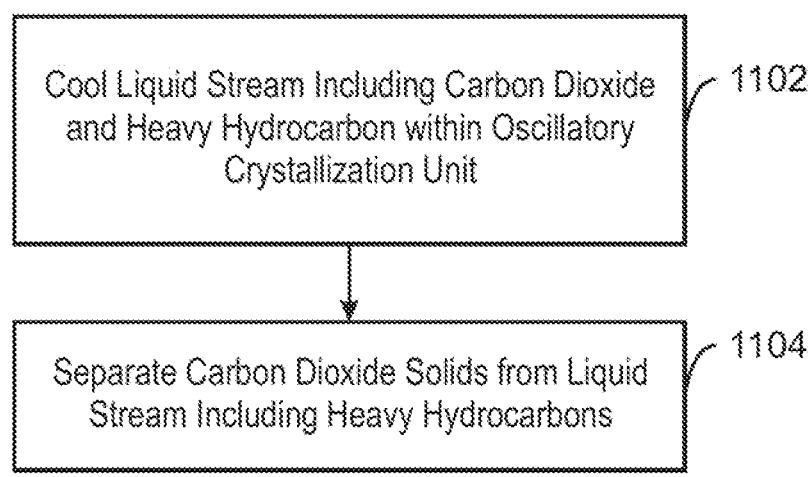
FIG. 11 is a process flow diagram of a method for separating $CO_2$ from NGLs.

FIG. 11 is a process flow diagram of a method 1100 for separating $CO_2$ from NGLs. The method 1100 may be implemented within any of the systems 400 or 600 discussed with respect to FIG. 4, 5, 6, or 7. In various embodiments, the temperature and pressure of a liquid stream including $CO_2$ and heavy hydrocarbons are reduced prior to the beginning of the method 1100. For example, a heat exchanger may be used to cool the liquid stream to a temperature that is slightly higher that the freezing point of $CO_2$, and a pressure reducing device may be used to reduce the pressure of the liquid stream.

The method 1100 begins at block 1102, at which the liquid stream including the $CO_2$ and the heavy hydrocarbons is cooled within an oscillatory crystallization unit to generate $CO_2$ solids and a liquid stream including the heavy hydrocarbons. This may be accomplished by flowing the liquid stream into a tube including a number of baffles, radially mixing the liquid stream via contact with the baffles and a production of pulsations within the liquid stream, and radially cooling the liquid stream within the tube via indirect heat exchange with a cooling medium. The radial cooling of the liquid stream may result in the generation of the $CO_2$ solids.

At block 1104, the $CO_2$ solids are separated from the liquid stream including the heavy hydrocarbons via a solid-liquid separation system. The $CO_2$ solids may then be flowed out of the solid-liquid separation system in either a solid or liquid phase, and the heavy hydrocarbons may be flowed out of the solid-liquid separation system as a NGL stream. In addition, $H_2S$ or any other acid gases within the liquid stream may also be flowed out of the solid-liquid separation system along with the NGL stream.

The process flow diagram of FIG. 11 is not intended to indicate that the steps of the method 1100 are to be executed in any particular order, or that all steps of the method 1100 are to be included in every case. Further, any number of additional steps may be included within the method 1100, depending on the details of the specific implementation. For example, in some embodiments, a separation system may be used to separate a methane stream from the liquid stream upstream of the oscillatory crystallization unit. The methane stream may then be flowed from the separation system to a heat exchanger that is upstream of the oscillatory crystallization unit, and may be used to cool the liquid stream within the heat exchanger. The methane stream may be flowed from the separation system to the oscillatory crystallization unit, and may be used to cool the liquid stream within the oscillatory crystallization unit. Further, in some embodiments, the methane is recycled to an upstream $CO_2$ separation system, such as a bulk fractionator, a physical solvent system, or a cryogenic distillation unit, such as, for example, a Ryan-Holmes column or a CFZ column.

In some embodiments, residual $CO_2$ is separated from the NGL stream to generate a purified NGL stream and an azeotropic mixture including $CO_2$ and NGL. The azeotropic mixture may then be used to cool the liquid stream upstream of the oscillatory crystallization unit. Alternatively, the azeotropic mixture may be recycled to the oscillatory crystallization unit. The oscillatory crystallization unit may cool the azeotropic mixture, generating $CO_2$ solids and a third liquid stream including the NGLs.

Embodiments

Embodiments of the invention may include any combinations of the methods and systems shown in the following numbered paragraphs. This is not to be considered a complete listing of all possible embodiments, as any number of variations can be envisioned from the description herein.

1. A method for separating carbon dioxide from heavy hydrocarbons, including:
cooling a first liquid stream including carbon dioxide and heavy hydrocarbons within an oscillatory crystallization unit to generate carbon dioxide solids and a second liquid stream including the heavy hydrocarbons; and
separating the carbon dioxide solids from the second liquid stream via a solid-liquid separation system.

2. The method of paragraph 1, including cooling the first liquid stream within a heat exchanger upstream of the oscillatory crystallization unit.

3. The method of paragraph 2, wherein the first liquid stream is cooled to a temperature that is slightly higher than a freezing point of the carbon dioxide within the heat exchanger.

4. The method of any of paragraphs 1 or 2, including reducing a pressure of the first liquid stream via a pressure reducing device upstream of the oscillatory crystallization unit.

5. The method of any of paragraphs 1, 2 or 4, wherein the first liquid stream is cooled to a temperature that is below a freezing point of the carbon dioxide within the oscillatory crystallization unit to generate the carbon dioxide solids.

6. The method of any of paragraphs 1, 2, 4, or 5, including separating the first liquid stream from a methane stream within a separation system upstream of the oscillatory crystallization unit.

7. The method of paragraph 6, including:
flowing the methane stream from the separation system to a heat exchanger that is upstream of the oscillatory crystallization unit; and
using the methane stream to cool the first liquid stream within the heat exchanger.

8. The method of any of paragraphs 6 or 7, including:
flowing the methane stream from the separation system to the oscillatory crystallization unit; and
using the methane stream to cool the first liquid stream within the oscillatory crystallization unit.

9. The method of any of paragraphs 6, 7, or 8, including recycling the methane stream to an upstream carbon dioxide separation system.

10. The method of any of paragraphs 1, 2, or 4-6, including separating hydrogen sulfide from the carbon dioxide solids along with the second liquid stream within the solid-liquid separation system.

11. The method of any of paragraphs 1, 2, 4-6, or 10, including:
separating residual carbon dioxide from the second liquid stream to generate a purified heavy hydrocarbon stream and an azeotropic mixture including carbon dioxide and heavy hydrocarbons; and
using the azeotropic mixture to cool the first liquid stream upstream of the oscillatory crystallization unit.

12. The method of any of paragraphs 1, 2, 4-6, 10, or 11, including:
separating residual carbon dioxide from the second liquid stream to generate a purified heavy hydrocarbon stream and an azeotropic mixture including carbon dioxide and heavy hydrocarbons; and
recycling the azeotropic mixture to the oscillatory crystallization unit, wherein the oscillatory crystallization unit cools the azeotropic mixture to generate carbon dioxide solids and a third liquid stream including the heavy hydrocarbons.

13. The method of any of paragraphs 1, 2, 4-6, or 10-12, wherein cooling the first liquid stream within the oscillatory crystallization unit includes:
flowing the first liquid stream into a tube including a number of baffles;
radially mixing the first liquid stream via contact with the number of baffles and a production of pulsations within the first liquid stream; and
radially cooling the first liquid stream within the tube via indirect heat exchange with a cooling medium, wherein the radial cooling of the first liquid stream results in the generation of the carbon dioxide solids.

14. The method of paragraph 13, including producing pulsations within the first liquid stream via a pump.

15. The method of any of paragraphs 13 or 14, including producing pulsations within the first liquid stream via thermoacoustics.

16. A system for separating carbon dioxide from heavy hydrocarbons, including:
an oscillatory crystallization unit configured to cool a first liquid stream including carbon dioxide and heavy hydrocarbons to generate carbon dioxide solids and a second liquid stream including the heavy hydrocarbons; and
a solid-liquid separation system configured to separate the carbon dioxide solids from the second liquid stream.

17. The system of paragraph 16, including a heat exchanger configured to cool the first liquid stream upstream of the oscillatory crystallization unit.

18. The system of paragraph 17, wherein the heat exchanger is configured to cool the first liquid stream to a temperature that is slightly higher than a freezing point of the carbon dioxide.

19. The system of any of paragraphs 17 or 18, wherein the heat exchanger includes a shell-and-tube heat exchanger, a brazed aluminum heat exchanger, a double pipe heat exchanger, or a chiller bundle heat exchanger, or any combinations thereof.

20. The system of any of paragraphs 16 or 17, including a pressure reducing device configured to reduce a pressure of the first liquid stream upstream of the oscillatory crystallization unit.

21. The system of any of paragraphs 16, 17, or 20, wherein the oscillatory crystallization unit is configured to cool the first liquid stream to a temperature that is below a freezing point of the carbon dioxide.

22. The system of any of paragraphs 16, 17, 20, or 21, including a separation system configured to produce the first liquid stream and a methane stream from a hydrocarbon feed stream.

23. The system of paragraph 22, wherein the separation system includes a methane separation system, controlled freeze zone (CFZ) column, a bulk fractionator, a Ryan-Holmes column, or a physical solvent system, or any combinations thereof.

24. The system of any of paragraphs 22 or 23, wherein the oscillatory crystallization unit is configured to use the methane stream to cool the first liquid stream.

25. The system of any of paragraphs 16, 17, or 20-22, wherein the solid-liquid separation system is configured to separate hydrogen sulfide from the carbon dioxide solids along with the second liquid stream.

26. The system of any of paragraphs 16, 17, 20-22, or 25, wherein the oscillatory crystallization unit includes a continuous oscillatory baffled crystallizer.

27. The system of any of paragraphs 16, 17, 20-22, 25, or 26, including an azeotropic distillation system configured to separate residual carbon dioxide from the second liquid stream to generate a purified heavy hydrocarbon stream and an azeotropic mixture including carbon dioxide and heavy hydrocarbons.

28. The system of paragraph 27, wherein the azeotropic mixture is used to cool the first liquid stream upstream of the oscillatory crystallization unit.

29. The system of any of paragraphs 27 or 28, wherein the solid-liquid separation system includes a cyclonic separator.

30. A system for removing carbon dioxide from natural gas liquids, including:
  a methane separation system configured to separate methane from a liquid stream including carbon dioxide and natural gas liquids;
  a heat exchanger configured to cool the liquid stream to a temperature that is slightly above a freezing point of the carbon dioxide;
  a pressure reducing device configured to reduce a pressure of the liquid stream;
  a continuous oscillatory baffled crystallizer configured to generate carbon dioxide solids and a natural gas liquids stream by radially cooling the liquid stream to a temperature that is below the freezing point of the carbon dioxide; and
  a solid-liquid separation system configured to separate the carbon dioxide solids from the natural gas liquids stream.

31. The system of paragraph 30, wherein the continuous oscillatory baffled crystallizer includes a number of baffles configured to produce a turbulent flow of the liquid stream as the liquid stream travels through the continuous oscillatory baffled crystallizer.

32. The system of any of paragraphs 30 or 31, wherein the continuous oscillatory baffled crystallizer includes a pump configured to produce a pulsating flow of the liquid stream within the continuous oscillatory baffled crystallizer.

33. The system of any of paragraphs 30-32, wherein the continuous oscillatory baffled crystallizer includes a thermoacoustic generator configured to produce a pulsating flow of the liquid stream within the continuous oscillatory baffled crystallizer.

34. The system of any of paragraphs 30-33, wherein a cooling medium flowing through the continuous oscillatory baffled crystallizer cools the liquid stream via indirect heat exchange.

While the present techniques may be susceptible to various modifications and alternative forms, the exemplary embodiments discussed herein have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A method for separating carbon dioxide from heavy hydrocarbons, comprising:
  cooling a first liquid stream comprising carbon dioxide and heavy hydrocarbons within an oscillatory crystallization unit to generate carbon dioxide solids and a second liquid stream comprising the heavy hydrocarbons; and
  separating the carbon dioxide solids from the second liquid stream via a solid-liquid separation system.

2. The method of claim 1, comprising cooling the first liquid stream within a heat exchanger upstream of the oscillatory crystallization unit.

3. The method of claim 2, wherein the first liquid stream is cooled to a temperature that is slightly higher than a freezing point of the carbon dioxide within the heat exchanger.

4. The method of claim 1, comprising reducing a pressure of the first liquid stream via a pressure reducing device upstream of the oscillatory crystallization unit.

5. The method of claim 1, wherein the first liquid stream is cooled to a temperature that is below a freezing point of the carbon dioxide within the oscillatory crystallization unit to generate the carbon dioxide solids.

6. The method of claim 1, comprising separating the first liquid stream from a methane stream within a separation system upstream of the oscillatory crystallization unit.

7. The method of claim 6, comprising:
  flowing the methane stream from the separation system to a heat exchanger that is upstream of the oscillatory crystallization unit; and
  using the methane stream to cool the first liquid stream within the heat exchanger.

8. The method of claim 6, comprising:
  flowing the methane stream from the separation system to the oscillatory crystallization unit; and
  using the methane stream to cool the first liquid stream within the oscillatory crystallization unit.

9. The method of claim 1, comprising separating hydrogen sulfide from the carbon dioxide solids along with the second liquid stream within the solid-liquid separation system.

10. The method of claim 1, comprising:
  separating residual carbon dioxide from the second liquid stream to generate a purified heavy hydrocarbon stream and an azeotropic mixture comprising carbon dioxide and heavy hydrocarbons; and
  using the azeotropic mixture to cool the first liquid stream upstream of the oscillatory crystallization unit.

11. The method of claim 1, comprising:
  separating residual carbon dioxide from the second liquid stream to generate a purified heavy hydrocarbon stream and an azeotropic mixture comprising carbon dioxide and heavy hydrocarbons; and
  recycling the azeotropic mixture to the oscillatory crystallization unit, wherein the oscillatory crystallization unit cools the azeotropic mixture to generate carbon dioxide solids and a third liquid stream comprising the heavy hydrocarbons.

12. The method of claim 1, comprising producing pulsations within the first liquid stream.

13. A system for separating carbon dioxide from heavy hydrocarbons, comprising:

an oscillatory crystallization unit configured to cool a first liquid stream comprising carbon dioxide and heavy hydrocarbons to generate carbon dioxide solids and a second liquid stream comprising the heavy hydrocarbons; and a solid-liquid separation system configured to separate the carbon dioxide solids from the second liquid stream.

14. The system of claim 13, comprising a heat exchanger configured to cool the first liquid stream upstream of the oscillatory crystallization unit.

15. The system of claim 14, wherein the heat exchanger is configured to cool the first liquid stream to a temperature that is slightly higher than a freezing point of the carbon dioxide.

16. The system of claim 13, comprising a pressure reducing device configured to reduce a pressure of the first liquid stream upstream of the oscillatory crystallization unit.

17. The system of claim 13, wherein the oscillatory crystallization unit is configured to cool the first liquid stream to a temperature that is below a freezing point of the carbon dioxide.

18. The system of claim 13, comprising a separation system configured to produce the first liquid stream and a methane stream from a hydrocarbon feed stream.

19. The system of claim 18, wherein the separation system comprises a methane separation system, controlled freeze zone (CFZ) column, a bulk fractionator, a Ryan-Holmes column, or a physical solvent system, or any combinations thereof.

20. The system of claim 13, wherein the solid-liquid separation system is configured to separate hydrogen sulfide from the carbon dioxide solids along with the second liquid stream.

21. The system of claim 13, comprising an azeotropic distillation system configured to separate residual carbon dioxide from the second liquid stream to generate a purified heavy hydrocarbon stream and an azeotropic mixture comprising carbon dioxide and heavy hydrocarbons.

* * * * *